United States Patent [19]

Smith

[11] 4,151,149

[45] Apr. 24, 1979

[54] VINYLIDENE CHLORIDE POLYMER LATICES

[75] Inventor: David R. Smith, Decatur, Ill.

[73] Assignee: Union Oil Company of California, Brea, Calif.

[21] Appl. No.: 727,208

[22] Filed: Sep. 27, 1976

[51] Int. Cl.$^2$ .......................................... C08L 27/08
[52] U.S. Cl. ...................... 260/29.6 SQ; 156/306; 260/29.6 TA; 427/385 R; 428/500; 526/287
[58] Field of Search ............... 260/29.6 TA, 29.6 SQ, 260/79.3 MU; 526/287

[56] References Cited

U.S. PATENT DOCUMENTS

| | | | |
|---|---|---|---|
| 2,694,699 | 11/1954 | Laasko et al. | 260/79.3 MU |
| 2,826,528 | 3/1958 | Shelanski et al. | 260/79.3 MU |
| 3,202,640 | 8/1965 | Taniyama et al. | 260/79.3 MU |
| 3,349,063 | 10/1967 | Mayer et al. | 260/79.3 MU |
| 3,497,482 | 2/1970 | Hwa | 260/79.3 MU |
| 3,714,106 | 1/1973 | Smith et al. | 260/29.6 TA |
| 3,839,393 | 10/1974 | Steckler | 260/458 |
| 3,843,581 | 10/1974 | Gibbs et al. | 260/29.6 TA |
| 3,850,726 | 11/1974 | Smith et al. | 156/333 |

*Primary Examiner*—Melvyn I. Marquis
*Attorney, Agent, or Firm*—Michael H. Laird

[57] ABSTRACT

The invention provides vinylidene halide copolymer latices comprises of (A) vinylidene halide as the principle copolymerized comonomer; (B) from about 0.2 to about 5 percent by weight of an ethylenically unsaturated sulfated monomer represented by the structural formula:

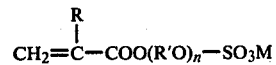

wherein R is hydrogen or alkyl, R' is a hydrocarbylene group, N is a positive integer and M is a cation; (C) from about 0.5 to about 25 percent by weight of a hydroxyalkyl ester of an alpha, beta-ethylenically unsaturated carboxylic acid; and up to 40 percent by weight of an ethylenically unsaturated monomer other than comonomers (A)–(C). The latices coating attributes may be selectively altered for a desired end-usage by varying the copolymer composition. Latices which may be converted to vinylidene chloride coatings of superior antiblocking and/or oxygen barrier resistance are provided.

21 Claims, No Drawings

# VINYLIDENE CHLORIDE POLYMER LATICES

BACKGROUND OF THE INVENTION

Within recent years, vinylidene chloride copolymers which rely upon copolymerizable surfactant comonomer systems have been reported (e.g., see U.S. Pat. Nos. 3,850,726; 3,714,106 and 3,736,303 by Smith et al.; 3,449,302 by Nachbur et al.; 3,617,368 by Gibbs; 3,843,581 by Gibbs et al.; 3,946,139 by Blyle et al., etc.). Particularly noteworthy are U.S. Pat. Nos. 3,850,726 and 3,714,106 by Smith et al. which enable the art to effectively coat unprimed polyolefin films with a high-solids, low viscosity vinylidene chloride copolymer latex. The Smith et al. latices have excellent film wetting and adhesion properties and provide coatings of exceptional heat-seal and dynamic peel strength properties.

U.S. Pat. No. 3,839,393 by Steckler discloses a method for preparing salts of sulfato-alkane acrylate and methacrylate. These salts are reportedly useful in preparing emulsion copolymers with certain comonomers such as acrylonitrile, vinyl chloride, styrene, n-butyl acrylate and methacrylic acid. Steckler discloses the reddish-purple, viscous liquids obtained by reacting sulfamic acid and hydroxyalkane acrylates or methacrylates are suitable for polymerization reactions and various industrial applications such as protective coatings, textile binders, paper coatings, etc.

The inventor sought to develop a unique vinylidene chloride copolymer latex system which possessed greater versatility in coating applications than existing internally emulsified copolymer latices. He desired a vinylidene chloride copolymer system which could be utilized to coat unprimed polyolefin without relying upon sulfoalkyl ester of alpha, beta-ethylenically unsaturated carboxylic acid comonomers. The inventor contemplated a stable vinylidene chloride copolymer latex system which possessed uniform and excellent wetting and adhesion attributes to impervious plastic substrates and especially suited for use at a high-solids, low viscosity levels in conventional high-speed film coating and heat-sealing operations. It was also desired to achieve vinylidene chloride copolymer coatings of excellent heat-sealing and dynamic peel strength properties. A more versatile vinylidene chloride copolymer latex system capable of providing superior oxygen-barrier and block-resistant coatings at a reduced level of copolymized vinylidene chloride comonomer was also sought by the inventor.

OBJECTS

It is an object of the invention to improve upon the versatility of vinylidene chloride copolymer latices in coating applications.

Another object of the invention is to provide vinylidene chloride copolymer coatings which possess unique and improved coating properties and articles coated therewith.

A further object is to provide vinylidene chloride copolymer latices which significantly improve upon the anti-blocking and/or oxygen-barrier resistance of vinylidene chloride copolymer coatings.

Another object is to provide a method for preparing novel vinylidene chloride copolymer latices and a method for coating substrates therewith.

DESCRIPTION OF THE INVENTION

According to the present invention there is provided vinylidene halide copolymer latices, said latices comprising an internal phase of vinylidene halide copolymer particles homogeneously dispersed within an external aqueous phase with said vinylidene halide copolymer particles being comprised of:

(A) vinylidene halide as the principle copolymerized comonomer;
(B) from about 0.2 to about 5 percent by weight of an ethylenically unsaturated sulfated monomer represented by the structural formula:

wherein R is at least one member selected from the group consisting of hydrogen and hydrocarbyl, R' represents a hydrocarbylene group, n is an integer having a value of at least one, and M is a cation;
(C) from about 0.5 to 25 percent by weight of a hydroxyalkyl ester of an alpha, beta-ethylenically unsaturated carboxylic acid; and
(D) up to 40 percent by weight of an ethylenically unsaturated monomer other than copolymerized comonomers (A), (B) and (C).

The unique characteristics of the vinylidene halide latices are achieved through the cooperative interaction of the over-all emulsified copolymerized monomer system in addition to the effect each copolymerized monomer exerts. The copolymerized vinylidene chloride monomer (A) significantly contributes to the moisture, oxygen and grease impermeability, toughness and heat-sealability properties of the coatings. The copolymerized hydroxyalkyl ester monomer (C) improves the latices wetting, adhesion and viscosity characteristics and imparts flexibility to the coatings. The copolymerized ethylenically unsaturated sulfated monomer (B) stabilizes the copolymer particles against coalescence (during the emulsion copolymerization and in the latice), provides a means to reduce the level of non-polymerizable emulsifiers and thus improves upon its wetting and adhesion properties, permits effective comonomeric copolymerization and realization of fine-sized, stabilized, emulsified copolymer particles (e.g., 0.5–0.2 microns). By copolymerizing the vinylidene chloride, sulfated and hydroxyalkyl comonomers with other ethylenically unsaturated monomers, the vinylidene chloride copolymer latices can be tailor-made so as to serve a wide variety of end-usages. The other copolymerized unsaturated monomers in conjunction with monomers (A)–(C) can be effectively used to achieve functionally important and balanced coating properties (e.g., flexibility, wetting, heat-seal, oxygen-barrier, vapor and moisture-resistance, anti-blocking, dynamic peel strength, appropriate latex crystallization, etc.). The latices appear to be uniquely stabilized against particle coalescense upon exposure to elevated temperatures such as encountered in conventional monomer stripping processes. This enhances their efficacy in food container coating applications.

The particles typically contain vinylidene chloride as the principal copolymerized monomer. In most applications, the vinylidene chloride will comprise a major portion of the total copolymer weight with a copolymerized vinylidene chloride content ranging from about 70% to about 90% being most typical. Heretofore, a high copolymerized vinylidene chloride content had generally been required to achieve an oxygen barrier resistance of less than 2.0 cc oxygen/100 inch$^2$ (at an application of 3-4 pounds dry polymer solids/3000 sq. ft.). Contrary to expectations, vinylidene chloride copolymer coatings with oxygen barrier resistance of less than 2.0 cc oxygen/100 square inches are now possible at significantly lower copolymerized vinylidene chloride levels (e.g., 75-85%). Stabilized vinylidene chloride copolymer latices with well-balanced and desirable coating attributes (e.g., excellent flexibility, strength, heat-seal and dynamic shear peel strength, resistance towards degradation under hot and humid conditions) may be effectively achieved at copolymerized vinylidene chloride levels ranging from about 75% to about 87%.

The ethylenically unsaturated sulfated monomer (B) copolymerized herein may be generally represented by the structural formula:

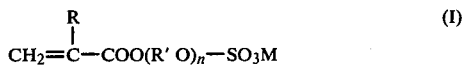
(I)

wherein R is a monovalent hydrocarbyl group or hydrogen, R' represents a hydrocarbylene group, n is a positive integer and M is a cation. The most suitable sulfated monomer (D) primarily depends upon its availability and desired functionality in the emulsion copolymerization and copolymer latice. The carbonyl, oxy, and M and sulfate groups affect the monomers hydrophilic properties in the emulsion polymerization reaction and prepared latices. Compatibility with hydrophobic systems is enhanced by the

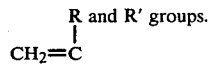
R and R' groups.

Sulfated monomers of sufficient hydrophobic character to overcome the strongly hydrophilic monomeric properties to achieve a monomer functioning both as an emulsifier for the emulsion polymerization and in the polymerizate product are possible from sulfated monomers which contain long-chained, appendant R and/or R' groups. Illustrative R groups include substituted and unsubstituted hydrocarbyls (typically containing less than about 18 carbon atoms) with the lower alkyls of 1-4 carbon atoms (particularly methyl) or hydrogen being preferred. The

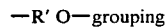
—R' O—grouping may be substituted and unsubstituted hydrocarbylene groups of from 1 to 25 carbon groups as further illustrated by the formula:

(II)

wherein R" represents either H or alkyl of from 1 to 22 carbon atoms and n is an integer of less than 50. Sulfated monomers wherein R is either methyl or hydrogen, R" is a saturated alkylene group of 1 to 2 carbon atoms inclusive and n has a value of 1 to 5 are particularly effective. M represents a cation. Illustrative cations include monovalent cations such as the group 1A elements (periodic chart) such as hydrogen, alkali-metals (e.g., lithium, sodium potassium, rubidium, cesium, francium), nickel, silver, gold, mercury, etc., polyvalent metal compounds of a monovalent valence, nitrogen compounds or bases which contain at least one acid reactive hydrogen atom such as ammonia; ammonium, primary, secondary, tertiary and quaternary amines and amides (e.g., see the Drury et al. U.S. Pat. Nos. 3,825,514; 3,950,290 and 3,951,892, etc.).

For certain coating applications such as metals and pervious substrates, it may be desirable to use more than 3% copolymerized sulfate monomer. Lesser amounts are better suited in providing water-insoluble coatings for impervious plastic substrates (e.g., films). As the copolymerized sulfate level increases, the vinylidene chloride copolymer latices become more water-sensitive which adversely affects its adhesion and suitability for use under humid conditions such as typically encountered in high speed coating and laminating processes. Improved plastic coating functionality and versatility are most commonly achieved when the amount of copolymerized sulfate monomer ranges from about 0.25% to about 2.5% with levels between about 0.5% to about 2.0% being particularly effective.

As disclosed in U.S. Pat. No. 3,839,393 by Steckler, sulfated monomers may be prepared by reacting hydroxyalkyl esters of alpha-beta ethylenically unsaturated acids with sulfamic acid. Due to the manner in which these monomers are prepared, the reaction product typically contains substantial amounts of ethylenically unsaturated hydroxyalkyl ester monomers. Since the hydroxyalkyl esters (C) are an essential copolymerized monomer constituent of the vinylidene chloride copolymer latices, their presence will not interfer with the production of the desired latices. The amount of hydroxyalkyl esters (C) in the sulfated monomer (B) should, however, be taken into account in determining the most appropriate ester level in the copolymer latices.

When it is desired to prepare a heat-sealable, vinylidene chloride latice adapted to coat corona-discharged, unprimed polyolefin films, the sulfated monomer (B) should not contain a deleterious level of non-polymerizable, water-soluble salts. Excessive water-soluble salt contamination (e.g., about 2.5% or higher) arising from by-products produced in the Steckler sulfated monomer process and subsequent degradative changes can destroy its efficacy for unprimed polyolefin film coating applications. These water-soluble salts (primarily ammonium sulfate) are hygroscopic and adversely function as desiccants within the latice and its coatings. This renders the latices ineffective for use in coating and heat-sealing processes conducted under humid conditions. Inferior wetting, adhesion, water-resistance properties also arise from excessive water-soluble salt contamination of the sulfated monomer. At acidic pH's (e.g., less than 6.0), the sulfated monomers will gradually hydrolyze into ammonium sulfate and hydroxyalkyl ester. This may be arrested by adjusting and maintaining the sulfated monomer at its most stable pH (e.g., pH 6.0-7.0). Sulfated monomer hydrolysis is generally accompanied by more acidid pH development (e.g., pH 2-3) arising from acidic by-products produced by its chemical degradation. Advantageously sulfated monomers which contain less than 1% (total sulfated monomer dry weight basis) and preferably less than 0.5% water-soluble, non-polymerizable salt contaminants are used as copolymerizable monomers herein.

When copolymerized with other comonomers, the copolymer sulfated monomer becomes stabilized against chemical decomposition and therefore may be converted to its acid form. For most coating applications, it is advantageous to employ sulfated monomers and vinylidene chloride copolymers which have been neutralized with a nitrogen base and particularly those neutralizers characterized as having at least one reactive hydrogen and a boiling point of less than 30° C. (760 mm). Volatile nitrogen bases having a boiling point less than 20° C. (e.g., ammonium hydroxide −38° C., methyl amine −7° C., diethylamine +4° C., ethylamine +16° C.) provide latices which dry more easily and uniformly than those of higher boiling points. These volatile bases function as non-fugitive coating additives. Upon drying these nitrogen bases are typically removed from the coating by volatilization. This results in conversion of the sulfated M cation salt to its acid or —R—O—SO$_2$OH form. The coating application and drying stages of the coating process as well as the finished copolymer coating or heat-sealed laminate benefit from this conversion. During the application and coating processing stages, these volatile copolymer salt moieties impart more desirable wetting and adhesion properties between the latice and substrate and aid in its drying. In the latter processing stages, these hygroscopic salt moieties convert to the acid form which is less hygroscopic. This conversion aids drying and renders the dried copolymer coating less sensitive to moisture and water as well as improving upon its adhesion to the substrate.

The emulsion copolymerization of the sulfated monomer with the vinylidene chloride (A), hydroxyalkyl ester (C) and other monomers provides a more stable vinylidene chloride without adversely affecting its desired coating attributes. The sulfated monomer is compatible and copolymerizable under emulsion polymerization conditions with a wide variety of monomers. The hydrophobic and hydrophilic portion of the sulfated monomer renders it compatible with other hydrophilic and hydrophobic monomers in aqueous systems. The sulfated monomers and copolymer particles containing the copolymerized sulfated monomers are effective emulsion and polymer stabilizers when combined with a low level of non-copolymerizable surfactants or wetting agents. This cooperative effect permits one to reduce the level of conventional and nonpolymerizable surfactant in the stabilized latice and thereby improve upon the wetting, adhesion, drying and water-insensitivity properties of the copolymer system. Stable and finer-sized vinylidene chloride copolymer particles are obtainable. The ability to prepare more stable and finer-sized copolymer particles is believed to arise because the sulfated monomers assist and maintain the appropriate micella formation during the emulsion copolymerization so as to yield finer-sized copolymerizate particles. The sulfated monomer also appears to significantly assist in preventing and stabilizing the latice particles against coalescence during the emulsion polymerization steps as well as in the finished latice product. Conventional vinylidene chloride latices are generally ineffective for further thermal refinement such as normally encountered in monomer stripping processes because of their susceptibility to coalescence at elevated temperatures. Latices having improved thermal stability against coalescence may be achieved under the present invention. This is particularly desirable when it is desired to remove sufficient residual unpolymerized monomers from the latice (e.g., monomer stripping techniques) to permit its use as a coating for food packaging material.

In addition to the copolymerized vinylidene chloride (A) and sulfated monomer (B), the vinylidene chloride copolymer particles contain at least one hydroxyalkyl ester of an alpha, beta-ethylenically unsaturated carboxylic acid (C). Illustrative hydroxyalkyl esters including hydroxymethyl acrylate, 2-hydroxypropylacrylate, 4-hydroxybutyl-1-acrylate, hydroxyethyl methacrylate, 2,3 dihydroxypropyl methacrylate, di(2,3-hydroxypropyl) itaconate, ethyl hydroxyethyl maleate, di(hydroxypropyl) fumarate, hydroxyethyl crotonate, hydroxypropyl methacrylate, mixtures thereof and the like. The hydroxyalkyl acrylates and methacrylates, particularly the esters which contain from 1 to 5 carbon atoms inclusive in the hydroxyalkyl group (especially those having 1–3 alkyl carbon atoms), are best suited in latices for coating polyolefin films.

The copolymerized hydroxyalkyl (C) level can vary considerably depending upon its intended end-usage. At copolymerized levels in excess of 25%, coatings prepared from the latices tend to become highly water-sensitive. Copolymer latices which contain from about 3% to about 15% (preferably from about 5% to about 10%) exhibit much better wetting and adhesion properties which makes them particularly well suited for high-molecular-weight, thermoplastic coating applications. The hydroxypropyl and hydroxyethyl methacrylates and acrylates impart exceptional wetting properties to the latices. For most applications, it is desirable to use these hydroxypropyl or hydroxyethyl esters as the principal and preferably as the major copolymerized hydroxyalkyl ester component (weight basis) of the copolymer particles. Hydroxyethyl acrylate and hydroxypropyl methacrylate alone or in combination at levels of at least 75% of the total copolymerized hydroxyalkyl ester (C) weight are particularly effective.

Although the vinylidene chloride copolymer latices of this invention may be prepared without copolymerized monomer (D), there are definite advantages in providing copolymer particles which contain from at least 1.0% to less than about 40% by weight copolymerized monomers other than monomers (A)–(C). In order to achieve the desired softening point, thermoplasticity, tensile strength, abrasion resistance, resiliency, wetting, adhesion, etc. properties, the vinylidene chloride copolymer will generally contain more than 5% (usually more than 10%) copolymerized monomers other than vinylidene chloride (by weight). Copolymerized monomers (B) and (C) enhance the latice stability and improve upon its wetting and adhesion properties as well as contributing to other desired properties. Unfortunately as the level of copolymerized comonomers (B) and (C) increases, the vinylidene chloride copolymer latice also becomes more hydrophilic. This renders the latice and vinylidene chloride copolymer coatings more sensitive to water and moisture which will adversely affect its application and coating properties. Latice coatings which tenaciously retain and absorb water are difficult to dry and use under humid conditions such as typically encountered in high speed film coating and lamination operations. Excessive coating water-sensitivity can also adversely affect the heat-sealability, dynamic peel strength, non-blocking, tack, water-resistance properties of the copolymer. Ethylenically unsaturated monomer (D) may be used to effectively overcome the adverse affects of copolymerized monomers (B) and (C) excesses while affording significant improvements in the over-all vinylidene chloride copolymer properties.

Polyvinylidene chlordie latices are extensively used for coating applications requiring excellent oil, solvent and oxygen barrier resistance. Polyvinylidene chloride latices and coatings, however, suffer from undesirable inherent defects such as premature crystallization, poor wetting and adhesion, a high softening point, poor thermoplasticity, inferior light and thermal instability, heat-seal, abrasion, tear resistance, elongation, resiliency, impact strength, dynamic-peel-strength, etc. properties. Depending upon the desired end-use, these defects may be altered or corrected by selecting the appropriate monomer (D) and monomers (A)–(C) combinations to meet the intended use without adversely impairing the desired oil, solvent and gas impermeability properties. The vinylidene chloride copolymers herein contain typically at least one copolymerized monomer (D) in an amount ranging from at least 1% to less than about 25% by weight monomer on a total dry copolymer weight basis with amounts between 2% to 20% being most typical. Exceptional latice wetting and adhesion properties for high molecular weight films to provide more desirable coating attributes such as heat-sealability, oxygen-barrier resistance, water-insensitivity, thermoplasticity, anti-blocking, etc. are advantageously achieved by copolymerizing about 5 to about 15% by weight monomer (D) with about 85–95% monomers (A)–(C). Copolymerized monomers (C) and (D) weight ratios respectively ranging from about 1:2 to about 2:1 (preferably at about 1:1) are particularly effective in achieving latices and copolymers possessing well-balanced wetting, adhesion and water-insensitivity properties. Latices containing from about 7% to about 13% by weight copolymerized monomer (D) and about 87–93% copolymerized monomers (A)–(C) have been found to be particularly useful for unprimed polyolefin coating applications.

A wide variety of copolymerized monomers (D) and combinations may be used to prepare the vinylidene chloride copolymer. Illustrative copolymerized monomers (D) include the esters of alpha, beta-ethylenically unsaturated carboxylic acids such as the $C_1$–$C_{18}$ esters of acrylic and methacrylic acid (e.g., the methyl, ethyl, isobutyl, butyl, 2-ethylhexyl, ethoxyethyl, alphacyano, isodecyl, lauryl, tridecyl, stearyl acrylates and methacrylates), the diesters of alpha, beta-ethylenically unsaturated dicarboxylic acids, such as dimethyl itaconate, diethyl fumarate, dimethyl maleate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, acrylamide, etc.; monovinyl aromatics, such as styrene, vinyltoluene, etc.; vinyl halides, such as vinyl chloride, vinyl bromide, etc.; alkyl vinyl ethers, such as methyl vinyl ether, ethyl vinyl ether, etc.; alkyl vinyl ketones, such as methyl vinyl ketone, etc. Copolymerized diethylenically unsaturated comonomers, such as allyl crotonate, allyl acrylate, polyhydric alcohol esters of alpha, beta-ethylenically monocarboxylic acids (e.g., 1,3-butylene dimethylacrylate, the diacrylate or dimethylacrylate of glycol, diethylene glycol, triethylene glycol, etc.) may also be used, if desired, and preferably at less than 2% of the total copolymer weight. Depending upon the end-usage, carboxylic acid containing ethylenically unsaturated acid monomers and salts thereof such as acrylic and methacrylic, the $C_1$–$C_8$ alkyl half ester of maleic and fumarate acid, etc. may also be used. For certain coating applications such as metals and pervious substrates (e.g., wood, paper, etc.), copolymerized monomers (D) which contain acid or acid salt groups (e.g., carboxylic acid or water-soluble salts thereof) can be effectively used to wet, adhere and coat substrates. In other coating applications such as crystalline and/or high molecular weight thermoplastic substrates (e.g., polyvinyl halides, polyvinylidene halides, polyolefins, etc.), improvements in the over-all coating process and coated products are obtained by omitting or maintaining the total weight amount of copolymerized monomers which contain acid or acid salt moieties at a level of less than 4% (inclusive of copolymerized monomers (B) and (D)) and advantageously at a level of less than 3% of the total polymer weight (preferably less than 2.0%).

If desired, the vinylidene chloride copolymer may be copolymerized with other copolymerizable monomers which exert a stabilizing effect (occasionally referred to as internally polymerized emulsifiers) upon the copolymer latices (e.g., see page 2, lines 2–11 supra). Typically the copolymerized sulfated monomer (B) will constitute the principal internal emulsifier of the present copolymer with added benefits being achieved when it comprises at least a major weight portion of the total copolymerizable internal emulsifier monomer weight. If other copolymerizable emulsifiers are used in combination with the sulfated monomer (B), the amount of copolymerized monomer is correspondingly reduced to take into account the effect these other copolymerizable emulsifier systems and especially for latices which are intended to be used to coat unprimed polyolefins. Copolymers wherein the copolymerized sulfated monomer constitutes substantially all of the internal copolymerized emulsifier system (e.g., greater than 95%) are preferred.

The properties of coatings prepared from the vinylidene chloride copolymer latices are effectively "tailored" by varying the comonomer (D) type and its weight proportion in the copolymerizate. It is usually desirable to retain the oil, solvent and oxygen barrier resistance characteristics which high levels of copolymerized vinylidene chloride impart to vinylidene chloride copolymer coatings. Inherent deficiencies typically encountered at high levels of copolymerized vinylidene chloride such as light instability, premature crystallization, poor tack and adhesion, high softening point, inferior thermoplasticity, heat-sealability, abrasion and tear resistance, resiliency, impact and dynamic peel strength properties are improved by copolymerization of the ethylenically unsaturated monomers (D). The most effective amount and type of copolymerized monomer (D) depends largely upon its intended end-use. When the level of copolymerized vinylidene chloride is reduced to less than about 75%, the oxygen barrier resistance of the vinylidene chloride copolymer coatings is inferior to coatings which have a higher copolymerized vinylidene chloride content. The present invention permits one to significantly reduce the vinylidene chloride copolymer content with a substantially lesser affect upon the oxygen barrier resistance of the coatings.

In general, copolymerized "hard" ethylenically unsaturated monomers (e.g., monomers which yield homopolymers of a $T_g$ greater than 50° C., and preferably at least 85° C.) are effective in achieving a high oxygen barrier resistance while improving upon the block-resistance, tensile strength and other desirable application and coating properties of the copolymer system.

The "soft" ethylenically unsaturated monomers (D) (e.g., copolymerized monomers which produce a homopolymer $T_g$ of less than 50° C. and preferably less than 20° C.) are effective for improving upon the copolymer's softening point and flexibility properties and to prevent crystallization thereof. The soft and hard monomers $C_1-C_8$ alkyl ester of acrylic and methacrylic esters (particularly the lower alkyl $C_1-C_4$ esters) are especially useful in modifying and improving upon the vinylidene chloride copolymer properties. Unexpectedly superior oxygen barrier properties may be achieved by employing the $C_1-C_3$ alkyl esters of methacrylic acid (particularly the methyl ester) as the major comonomer (D) (weight basis) and especially when copolymerized at a level of greater than 2% of the total polymer weight and preferably wherein the $C_1-C_3$ alkyl comprises more than about 75% of the total copolymerized monomer (D) weight. Exceptional non-blocking, oil, solvent and water resistance with a relatively high level of oxygen barrier resistance can be achieved by copolymerizing at least 4% by weight (total polymer weight) of a soft alkyl ester of acrylic or methacrylic acid (e.g., $T_g$ less than 20° C.) with the $C_1-C_4$ acrylic esters (particularly methyl) and/or the $C_4$ alkyl and higher esters of methacrylic acid. Copolymerized soft alkyl esters in an amount ranging from about 2 to about 10% is generally sufficient to provide non-blocking vinylidene chloride copolymers. A good balance between non-blocking and oxygen-barrier resistance properties is achieved through the copolymerization of a sufficient amount of hard and soft alkyl ester comonomers to provide a vinylidene chloride copolymer which has a $T_g$ ranging from about $-20°$ C. to about 20° C. and preferably between about $-15°$ C. to about 10° C.

When water-sensitivity is not an important consideration, a proper balance between hydrophilic and hydrophobic monomers can be used to provide latices without the aid of additional non-polymerizable surfactants. However, for most applications, it is generally desirable to utilize non-polymerizable surfactants in order to obtain the proper copolymer particle size, to improve the latices wetting properties, to stabilize the latices against coulescense (e.g. prior, during and after its preparation and use) as well as providing coatings with water-insensitivity. The optimum amount of surface active agent depends upon its intended use and potency of the surfactant system.

Although the surfactant content may broadly range from 0.1 to about 5% (dry polymer weight basis), latices containing more than 0.25% non-polymerizable surfactants are more stable than those containing a lesser amount. At the more elevated surfactant levels (e.g. 2-5%), foaming and water-sensitivity, lack of adhesion under humid conditions become difficult to achieve. It is advantageous to employ a sufficient amount of non-polymerizable surfactant so as to provide a latice having surface tension between 25 to about 70 dynes/cm (at 46% by weight dry solids). Non-polymerizable surfactants in an amount sufficient to provide a surface tension of at least 35 dynes/cm (at 46% solids) at less than a 1.5% concentration will perform better (e.g. better stability, wetting, water-insensitivity, etc.) than those of a lesser surface tension. Non-polymerizable surfactant combinations which provide a latice surface tension between about 45 to about 65 dynes/cm (advantageously at least 50) at a concentration between 0.35%–1.0% (dry polymer weight) are best suited in reducing the latice water-sensitivity to a more acceptable level. When wetting, water-insensitivity, heat-sealability, adherence, heat-sealed barrier strength, stability against high humidity, aging, etc. for the latices and coatings are critical (e.g. high speed, unprimed polyolefin, heat-sealing processes), surfactants capable of providing a surface tension of at least 54 dynes/cm (e.g. 54 to about 60) at levels ranging from about 0.4% to about 0.8% (preferably about 0.5 to about 0.7%) are used.

Conventional non-polymerizable surfactants may be used in conjunction with the polymerizable surfactant monomer (D) to stabilize the latice. The nonionic and-/or anionic surfactants are more effective as surfactants (e.g. see McCutcheon's *Detergents & Emulsifiers,* North American Edition 1976 Annual). In general, the anionic surfactants are more potent and effective as latice stabilizers and yield smaller sized copolymer particles than the nonionics. Accordingly, the anionics may be generally used at a lower surfactant concentration which, in turn, results in improved water-insensitive coatings. Illustrative surfactants include those such as described in U.S. Pat. Nos. 3,850,726 by Smith et al., 3,968,310 by Stowell, column 4, lines 29-48, and 3,970,585, and particularly those surfactant combinations which provide an average particle size of less than 0.25 microns and preferably between about 0.1 to about 0.2.

Surfactant systems relying upon a combination of at least two different surfactants having differing critical micelle concentration (i.e. CMC) in an amount sufficient to provide a latice average particle size of less than 0.2 microns at a total non-polymerizable surface concentration of less than 0.8% (copolymer dry weight basis) are best suited in providing stable and water-insensitive coatings and latices. The surfactant combination of hydrocarbylpolyoxyalkylene sulfate with the alkyl and/or cycloalkyl (e.g. $C_6-C_{18}$) di-esters of an alkali metal sulfo-succinate surfactant are especially useful in achieving stable, fine-sized copolymer particles, particularly when further combined with at least one other anionic surfactant of a different composition. The hydrocarbylpolyoxyalkylene sulfates may be represented by the formula:

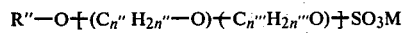

wherein R″ represents a hydrocarbyl group; n″ and n‴ represent the number of carbon atoms in the alkylene group which may be of the same value or different; d represents the number of repeating polyoxyalkylene units (e.g. most typically greater than 5 and less than 50); and M is a cation. Advantageously used are those formula III surfactants wherein d has a value of between about 10 to about 25; R‴ represents a $R_p$‴-Ar group wherein R‴ is an alkyl of about 5 to about 22 carbon atoms (preferably at least 8 carbon atoms); Ar is an arylene group (e.g. phenylene, phenonyl, etc.) and p represents the number of alkyl groups attached to the arylene group (e.g. p being one or a plurality of alkyl groups which may be the same or different with monoalkyl and dialkylphenoxy grouping being preferred); n″ and n‴ represent a lower alkylene group of two or more carbon atoms (preferably 2-4 carbon atoms inclusive), and M represents a cation (e.g. hydrogen and cations obtained by neutralization with a base as mentioned above inclusive of those disclosed in column 5, line 47 to column 6, line 2 of U.S. Pat. No. 3,968,310).

In the preferred embodiments of the invention, there are provided latices containing as the principal surfactants on a dry weight basis at least two anionic surfactants selected from the group of hydrocarbylpolyoxyalkylene sulfate, alkyl or cycloalkyl di-esters of sodium sulfosuccinic acid and free acid of a complex organic phosphate ester (preferably as the major surfactants) in an amount sufficient to provide copolymer particles of less than 0.2 micron size. The free acid of a complex organic phosphate esters are effective surfactants in combination with these succinic and sulfate anionic surfactants. Illustrative proportions (on a 100 parts by weight total dry surfactant base) for a three-component anionic surfactant system include from about 4 to about 40 parts by weight (preferably from about 10 to about 30 parts by weight) hydrocarbylpolyoxyalkylene sulfate, about 20 to about 80 parts by weight sodium dialkyl or dicycloalkyl sulfosuccinate (preferably about 30 to about 70 parts by weight dialkyls and/or dicycloalkyl of $C_6$–$C_{14}$ atoms inclusive being preferred), and from about 1 to less than about 55 parts by weight (preferably about 2 to about 50 parts by weight) and another anionic surfactant such as the complex organic phosphate ester surfactants. The surfactant combination is preferably selected so as to provide copolymer particles of a size ranging from about 0.1 to about 0.15 microns.

The vinylidene chloride copolymer latices are conveniently prepared under the emulsion polymerization conditions described in U.S. Pat. Nos. 3,736,303 and 3,850,726 by Smith et al. Seed formation is unnecessary when the proper surfactant combinations are used. In order to achieve fine-sized copolymer particles, the hydrophobic monomer should be pre-emulsified with the non-polymerizable surfactant so as to provide a monomer feed stream and polymerization reaction media which is essentially free from any visible monomer phase separation (e.g., homogeneous). Pre-emulsion of the comonomer streams with either intermittent or continuous addition of pre-emulsified comonomer feed streams provide fine particle sized copolymer latices. The emulsion polymerization process employing the sulfated comonomers and nonpolymerizable surfactant combination produces latices containing a nominal amount of coagulum. The copolymerizate particles in the final latex product are stable against excessive coagulum development at elevated temperatures. This permits one to strip unpolymerized comonomers (typically at about 500–1000 ppm) from the latice (e.g., to less than 100 ppm and preferably less than 20 ppm free monomer on a total copolymer dry weight basis).

In order to preserve the water-insensitivity of the latice, excessive organic or inorganic, water-soluble salt contamination should be avoided. Accordingly, the maximum total salt contaminants (dry solids copolymerizate basis) exclusive, of catalysts which effectively become part of the polymer (e.g., persulfates) but including salt impurities from buffers, surfactants, sulfated monomers, etc., for latices intended for use to prepare water-insensitive coatings is less than 1.0%, advantageously less than 0.5%, and preferably less than 0.3%. This may be accomplished by taking the necessary precautions to prevent the addition of water-soluble salts to the polymerization feed other than those arising from the sulfated monomer and required surfactants and buffers. Relatively salt-free reagents should be used in the emulsion polymerization reaction.

The vinylidene chloride copolymer latices may be used to prepare a variety of shaped articles (e.g., molded, extruded, coated, etc. articles). The vinylidene chloride latices are particularly well-adapted for use as heat-sealable, barrier coatings for a variety of substrates and particularly for high molecular weight thermoplastic films or sheets. The lattices may be coated upon a suitable substrate, dried and heat-sealed to provide heat-sealed coatings of excellent dynamic peel strength even when aged for prolonged periods under humid and/or hot conditions.

The following examples are illustrative of the invention.

EXAMPLE I

A high-oxygen barrier vinylidene chloride copolymer latice was prepared from the following reagents:

|  |  | Reagents | Parts by Weight (Wet) |
|---|---|---|---|
| Comonomer Pre-emulsion |  | Water | 6.320 |
|  | A | Abex 26S[1] | 0.140 |
|  |  | Aerosol A-196[2] | 0.139 |
|  |  | Water | 0.583 |
|  | B | Gafac RE-960[3] | 0.103 |
|  |  | Water | 0.389 |
|  | C | COPS II[4] | 1.240 |
|  |  | Water | 3.719 |
|  | D | Hydroxypropyl Methacrylate | 3.695 |
|  | E | Methyl Methacrylate | 3.695 |
|  | F | Vinylidene Chloride | 38.889 |
| Reactor Charge |  | Water | 21.876 |
|  | G | Ammonium Citrate Dibasic | 0.073 |
|  |  | Ammonium Persulfate | 0.087 |
|  | H | Aerosol A-196[2] | 0.012 |
|  |  | Water | 0.049 |
|  | I | Gafac RE-960[3] | 0.058 |
|  |  | Water | 0.243 |
|  | J | COP II[4] | 0.219 |
|  |  | Water | 0.656 |

| | | | Parts by |
|---|---|---|---|
| | | | |
| | K | Water (flush) | 0.681 |

[1]Abex 26S - Sodium alkyl($C_{8+}$) aryl polyoxyethylene (30+) sulfate

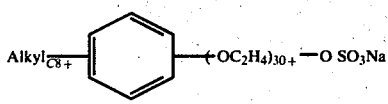

anionic liquid surfactant (33% active sulfate) manufactured and sold by Alcolac, Inc., Baltimore, Maryland

[2]Aerosol A-196 - Sodium dicyclohexyl sulfosuccinate, 85% active anionic surfactant in pellet form, manufactured and distributed by American Cyanamid Company, Wayne, N.J.

[3]Gafac RE-960 - Free acid of complex organic phosphate esters, 95% active anionic surfactant in wax form, manufactured and sold by GAF Corporation, Chemical Products, New York, N.Y.

[4]COPS II - An ammoniated sulfated hydroxyethyl methacrylate

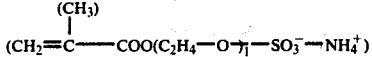

containing on a total weight basis 49-53% by weight sulfated hydroxyethyl methacrylate, 36-38% by weight hydroxyethyl methacrylate, less than 1% methacrylic acid, 9-12% water, and less than about 1% watersoluble organic and inorganic salt impurities, manufactured and sold by Alcolac, Inc., Baltimore, Maryland

| | | Reagents | Parts by Weight(Wet) |
|---|---|---|---|
| Catalyst | L | Ammonium Persulfate | 0.114 |
| | | Water | 7.486 |
| Activator | M | Erythorbic Acid | 0.087 |
| | | Water | 8.653 |
| Post Additives | N | 35% Hydrogen Peroxide | 0.016 |
| | | Water | 0.778 |
| | | Totals | 100.000 |

Aqueous solutions of pre-emulsified COPS II and reactor charge COPS II were separately prepared by slowly adding the designated amount of COPS II to the designated amounts of cooled water (20° C.) (e.g., see C and J above) and stirring until the polymerizable sulfated monomers were uniformly dispersed therein. The cooled aqueous COPS II[4] solutions (20° C.) were then adjusted to a pH 4.8 with 7% aqueous ammonia.

The comonomer pre-emulsion was made by initially preparing separately aqueous emulsifier solution (A) (i.e., designated amounts of water, Abex 26S[1] and Aerosol A-196[2]) and emulsifier solution (B) (i.e., designated amounts of water and Gafac RE-960[3]). Aqueous emulsifier solution (B) was cooled to 43° C. and adjusted to pH 7.0 with 26° Be aqueous ammonia.

Into the nitrogen-purged and blanketed pre-emulsifer holding tank equipped with a stirrer, there was initially added 6.32 parts by weight water, followed by additions of aqueous emulsifier solution (A) and then the addition of aqueous emulsifier solution (B). Aqueous emulsion solutions (A) and (B) were homogeneously mixed with the water and adjusted to 27° C. The aqueous COPS II[4] solution (C) was then transferred to the aqueous emulsion solutions (A) and (B) and moderately stirred (at 27° C.) for 15 minutes to form a homogeneous solution of (A), (B) and (C). The hydroxypropyl methacrylate (D) was then homogeneously dispersed into the emulsifier COPS II[4] solution (D-C), stirred for 10 minutes and adjusted to 27° C. The homogeneous holding tank mixture (A-D) was then charged with the methyl methacrylate (E), stirred for 10 minutes to ensure homogeneous dispersion of the methyl methacrylate (E) therein and adjusted to 27° C. A 12.64 parts by weight portion of the vinylidene chloride (F) was then drawn into the holding tank while maintaining it at 27° C., followed by another 12.64 parts by weight charge of vinylidene chloride charge (F) with the vinylidene chloride balance (13.609 parts by weight) then being admitted to the pre-emulsion holding tank. The pre-emulsion reagents were then continuously stirred under 15 p.s.i. nitrogen blanket and maintained at 27° C. so as to provide a homogeneous pre-emulsion for the emulsion copolymerization reaction.

[1-4] - supra.

Solutions of the activator (M) and catalyst solution (L) were separately prepared and respectively transferred to an activator holding tank and a catalyst holding tank which was equipped with metering devices.

A water-cooled, glass lined reactor was then charged with the 21.876 parts by weight of the reaction charge of water and heated to 44.5° C. While continually stirring (60 rpm) the heated water reactor charge, the dibasic ammonium citrate, ammonium persulfate, aqueous Aerosol A-196[2] solution (F), and aqueous Gafac RE-960[3] solution (G) (prepared in same manner as (B) above) and aqueous COPS II[4] solution (I) were sequentially charged to the reactor.

[2] - Supra [3] - Supra [4] - Supra

The reactor charge reagents were then vacuum sealed and blanketed with nitrogen (0 p.s.i.) and adjusted to 47° C. with activator (M) being continuously metered into the reactor at 0.019 parts by weight per minute. Five minutes after initial admission of the activator to the reactor, the comonomer pre-emulsion was continuously fed into the reactor with continuous moderate stirring of the emulsion polymerization media. The emulsion polymerization reaction temperature was maintained between 47°-50° C. by coding and regulating the addition rate of the comonomer pre-emulsion, catalyst and activators to the reactor. When approximately 17.5% of the total comonomer pre-emulsion had been charged to the reactor (about 2 hours after commencing the pre-emulsion feed), the rate of catalyst addition was about 0.025 parts by weight per minute. The comonomer pre-emulsion was fed to the reactor at a rate of about 0.0474 parts by weight per minute for the first 4 hours (i.e., until about 40% of total pre-emulsion had been charged) and at an accelerated rate of about 0.0716 parts by weight per minute for the remaining 4 hours (i.e., for 60% remaining pre-emulsion balance). The comonomer pre-emulsion, catalyst and activator charges were completed after about 8 hours. The reaction was then allowed to continue for an additional 30 minutes, followed by post addition of aqueous hydrogen peroxide solution (N) to reaction and then heating at 63° C. with continuous stirring for an additional 45 minutes to complete the emulsion polymerization reaction.

The resultant emulsion was then cooled to 100° F. and adjusted to pH 2.0–3.0 (if not within range) with 7% aqueous ammonium solution and then coagulum (<0.1% wet weight) was removed from the latice by straining through a 50-mesh screen.

The resultant vinylidene chloride was analyzed and used to coat corona discharge-treated polypropylene and prepare heat-seal laminates in accordance with the test methods of U.S. Pat. No. 3,850,726 by D. R. Smith et al. with the following results:

| | Latice |
|---|---|
| Total dry solution weight percent | 46% |
| pH | 2–2.5 |
| Brookfield viscosity (25° C., 12 rpm, #1 Spindle) | 10 cps |
| Surface tension | 57 dynes/cm |
| Shear Stability | |
| Foam[5] | 165 ml |
| Coagulum (#100 U.S. screen) | None |
| Average particle size | 0.12–0.14 |
| Sediment on U.S. #80 screen | None |
| Heat-Sealed Coatings | |
| Oxygen permeability[6] | 1.5 cc/100 in.$^2$/1 atm/24 hours |
| Dynamic peel strength | |
| Ambient (at 23° C., and 40% R.H.) | 250 gms/inch |
| High humidity (aged 16 hours at 38° C. and 100% R.H.) | 150 gms/inch |

[5]Volume after 100 cc latex sheared 5 minutes in Servall ® Omni-mixer (Ivan-Sorvall, Inc.) at 16,000 rpm.
[6]Latice coat weight of 4 pounds/1000 ft$^2$ polypropylene film via Mocan Oxy-tran testing apparatus On a dry polymer weight basis, the copolymer comprised 81.77% vinylidene chloride (A), 8.90% hydroxyalkyl esters of methacrylic acid (B) (7.77% HOPMA and 1.13% HOEMA from COPS II[4]), 7.77% methyl methacrylate (D) and 1.56% COPS II[4] (B) as copolymerized comonomers. The amount of non-polymerizable anionic surfactant (dry polymer weight basis) was 0.687% (0.96% Abex 26S[1], 0.322% Gafac RE-960[3] and 0.269% Aerosol A-196[2]). Taking into account the water-soluble salt impurities arising from COPS II[4], the nonpolymerizable surfactants (i.e., salts other than active surfactants), the buffer (ammonium citrate dibasic) etc. but excluding those reagents which enter into the copolymerizate polymerization reaction or decompose without salt residues (e.g., catalysts such as the 0.423% persulfate, the latice contained less than 0.30% (about 0.283%) organic and inorganic water-soluble salts (dry copolymer weight basis).
[1] - Supra [2] - Supra [3] - Supra [4] - Supra The vinylidene chloride latices were employed to prepare heat-sealed, corona-discharge-treated, unprimed polypropylene films (0.75 mil thickness) in a high-speed, in-line coating and lamination process (coating applied to polypropylene surface with coating heat-sealed in a face-face relationship). The vinylidene chloride uniformly wetted and adhered to films notwithstanding the hot and humid coating and lamination conditions. As evidenced from the above dynamic peel strength results, the resultant heat-sealed laminates had excellent peel strength even when aged for 16 hours at 38° C. and 100% R.H. The laminates exhibited unexpectedly superior oxygen barrier resistance especially in view of the fact the copolymer latice contained less than 82% copolymerized vinylidene chloride. The latice exhibited excellent stability against coalescence when exposed to elevated temperature and under freeze/thaw cycling.

Blocking characteristics of heat-sealed, vinylidene chloride copolymer coatings which are in direct contact with the unprimed polypropylene film under pressure may be improved by chill-rolling and surface treatment with anti-blocking additives such as waxes and silica.

EXAMPLE II

A vinylidene chloride copolymer latice of improved block resistance was prepared from the following reagents:

| | Reagents | Parts by Weight (Wet) |
|---|---|---|
| Pre-emulsion | Water | 6.320 |
| | A Abex 26S[1] | 0.140 |
| | Aerosol A-196[2] | 0.139 |
| | Water | 0.583 |
| | B Gafac RE-960[3] | 0.103 |
| | Water | 0.389 |
| | C COPS II[4] | 1.240 |
| | Water | 3.719 |
| | D Hydroxyethyl Acrylate | 1.361 |
| | Hydroxypropyl Methacrylate | 2.333 |
| | Methyl Methacrylate | 3.695 |
| | Methyl Acrylate | 1.847 |
| | Vinylidene Chloride | 37.043 |
| Reactor Charge | Water | 21.876 |
| | E Ammonium Citrate Dibasic | 0.073 |
| | Ammonium Persulfate | 0.087 |
| | F Aerosol A-196[2] | 0.012 |
| | Water | 0.049 |
| | G Gafac RE-960[3] | 0.058 |
| | Water | 0.243 |
| | H COPS II[4] | 0.219 |
| | Water | 0.656 |
| | I Water (flush) | 0.681 |
| Catalyst | J Ammonium Persulfate | 0.114 |
| | Water | 7.486 |
| Activator | K Erythorbic Acid | 0.087 |
| | Water | 8.653 |
| Post Additives | L 35% Hydrogen Peroxide | 0.016 |
| | Water | 0.778 |
| | Totals | 100.000 |

[1]Supra
[2]Supra
[3]Supra
[4]Supra

The homogeneous aqueous solutions (A-C) were prepared and charged to the reactor as in Example I. The pre-emulsified comonomers were added to aqueous solutions (A-C) in the sequential order of hydroxypropyl methacrylate, methyl methacrylate, hydroxyethyl acrylate, methyl acrylate followed by three equal aliquots of vinylidene chloride. The emulsion polymerization reaction was conducted pursuant to the methodology of Example I.

The latice properties were comparable to the Example I copolymer latice. The heat-sealed vinylidene chloride copolymer-unprimed-polypropylene film test results (per Example I) were an oxygen permeability of less than 1.2 cc/100 in.$^2$/k atm./24 hrs. and a dynamic peel strength at ambient conditions of 200 gms./inch and under high humidity aging of 150 gms./inch. The oxygen barrier properties was unexpectedly low since this copolymer contained less vinylidene chloride than the Example I copolymer. The non-blocking properties of the polypropylene films coated with the vinylidene chloride coatings were determined by placing films face to back and subjecting them to 10 psi (at 38° C. for 16 hrs.) in an ICC block tester and measuring the ease of release. No sticking or blocking was observed. On a copolymerized comonomer weight basis, the copolymer contained 77.74% vinylidene chloride (A), 1.67% COPS II[4] (B), 8.96% hydroxyalkyl esters of acrylic and methacrylic acid (C) (includes 2.86% hydroxyethyl acrylate, 4.90% hydroxypropyl methacrylate, 1.20% hydroxyethyl methacrylate from COPS II[4]) and 11.63% comonomer (D), (7.75% methyl methacrylate and 3.86% methyl acrylate). The latices contained on a dry copolymer weight basis 0.686% non-polymerizable anionic surfactant and less than 0.3% water-soluble organic and inorganic salt impurities (not including the persulfate catalyst). The vinylidene chloride copolymer latice had many of the desirable coating and lamination properties of the Example I latice with the added benefit of improved resistance towards blocking. The latice may be used for in-line lamination processes as well as direct roll-up operation wherein the heat-sealed coatings are placed on reels for future use in preparing heat-sealed packaging material.

[4] - Supra

Although the above Examples illustrate latices which contain 46% copolymer dry solids, the copolymer solids of the latice may be varied to suit its intended use (e.g., about 15% to 65%). It is convenient to ship in commerce latices which contain at least 35% polymer solids and preferably more than about 45% dry copolymer solids. Although it is feasible to prepare latices which contain 65% or more copolymer solids, more stable latices are generally obtained at levels of less than 65% and advantageously ranging from about 45% to about 60%.

Unless specifically mentioned otherwise, the term "principal" refers to the weight of a designated component or components which are present within the designated class in a more prominent weight amount (e.g., higher weight percent) than another component falling within the descriptive class definition. In contrast to the term "major" (meaning more than 50% by weight), a principal component or component combination can be present in an amount less than a major amount of the descriptive class provided its weight percent is greater than another member of the class (e.g., copolymerized vinylidene chloride at 45% of the total copolymer weight with the other individual copolymerized monomers being present at a lesser weight percent).

The copolymer particle size herein refers to "average particle size" of synthetic latices as determined by turbidity measurements, Arnold B. Loabel Official Digest, February, 1959, pages 200–213.

Unprimed and untreated polyolefin films generally have a low critical surface tension (e.g., 29 dynes/cm) and have poor latice wetting and adhesion properties. Conventionally these films are oxidatively treated (e.g., flame, chemical oxidation reagents such as by dichromates, or corona discharge treatment) to improve upon their wetting and adhesion properties (e.g., creates polymeric ionic groups such as carbonyl, carboxyl, etc.). Such films typically have a critical surface tension in excess of about 38 dynes/cm (e.g., 38–43). These oxidatively treated unprimed polyolefin films (especially those of 40 dynes/cm or higher) are used as unprimed polyolefins.

It is generally desirable to laminate the vinylidene chloride coatings to substrates by pressure and/or heat treatment. The catalysts, activators and other emulsion polymerization as well as the coating and lamination conditions of U.S. Pat. No. 3,850,726 apply to the copolymers of this invention.

What is claimed is:

1. A vinylidene halide copolymer latex comprising an internal phase of vinylidene halide copolymer particles homogeneously dispersed within an external aqueous phase, said vinylidene halide copolymer particles comprising the copolymerizate of:

(A) vinylidene halide as the principal copolymerized comonomer;

(B) from about 0.2 to about 5 percent by weight of an ethylenically unsaturated sulfated monomer represented by the structural formula:

wherein R is at least one member selected from the group consisting of hydrogen and hydrocarbyl, R' represents a hydrocarbylene group, n is an integer having a value of at least one, and M is a cation;

(C) from about 0.5% to 25% by weight of a hydroxyalkyl ester of an alpha, beta-ethylenically unsaturated carboxylic acid; and (D) up to 40 percent by weight of an ethylenically unsaturated monomer other than copolymerized comonomers (A), (B) and (C).

2. The latex according to claim 1 wherein the copolymer contains (on a copolymer weight basis) vinylidene chloride (A) as the major copolymerized comonomer, from about 0.25% to about 2.5% copolymerized sulfated monomer (B), from about 2% to about 20% hydroxyalkyl ester of an alpha, beta-ethylenically unsaturated carboxylic acid and at least 4% to less than 25% by weight copolymerized comonomer (D).

3. The latex according to claim 2 wherein the copolymer particles have an average particle size of less than 0.25 micron and the latice contains (on a copolymer dry weight basis) between 0.25% to 1.5% non-polymerizable surfactant.

4. The latex according to claim 3 wherein copolymerized comonomers (A), (B) and (C) comprise about 85% to about 95% of the copolymer weight with the balance of the copolymer weight being comprised of copolymerized comonomer (D).

5. The latex according to claim 1 wherein the copolymerized monomers comprises from about 70% to about 95% vinylidene chloride, from about 3% to about 15% hydroxyalkyl acrylate and hydroxyalkyl methacrylate, from about 0.5% to about 2% sulfated monomer, the latice is stabilized with at least one non-polymerizable surfactant selected from the group consisting of anionic surfactant and non-ionic surfactant with the total anionic and non-ionic surfactant concentration in said latice (on a dry copolymer weight basis) ranging from 0.35% to 1.0% and the copolymer average particle size ranges from about 0.1 to about 0.2 microns.

6. The latex according to claim 5 wherein the total water-soluble salt content of the latice is less than 0.5% of the copolymer dry weight, the copolymer comprises less than 3% by weight copolymerized monomers which contain acid and acid salt moieties and the hydroxyalkyl acrylate and hydroxyalkyl methacrylate consists essentially of hydroxyalkyl groups containing from 1 to 3 carbon atoms inclusive.

7. The latex according to claim 6 wherein the sulfated monomer formula, R represents either hydrogen or lower alkyl group of 1 to 4 carbon atoms inclusive, R' represents a saturated alkylene group of 2 to 4 carbon atoms inclusve, n has a value of 1 to 5 inclusive and M represents a fugative cation having a boiling point of less than 30° C. at 760 mm pressure.

8. The latex according to claim 6 which contains on a copolymerized comonomer weight basis from about 75% to about 87% vinylidene chloride, from about 5% to about 10% hydroxyalkyl ester (C) monomer with the hydroxypropyl and hydroxyethyl esters of methacrylic acid and acrylic acid comprising at least 75% by weight of the total copolymerized monomer (C) weight, and from about 7% to about 13% by weight copolymerized monomer (D).

9. The latex according to claim 8 wherein a major weight portion of copolymerized monomer (D) is comprised of alkyl esters of an alpha, beta-ethylenically unsaturated, monocarboxylic acid in which the alkyl ester of said monomer (D) contains from 1 to 8 carbon atoms inclusive.

10. The latex according to claim 8 wherein at least 75% by weight of monomer (D) is comprised of alkyl acrylates or alkyl methacrylates or a mixture of an alkyl acrylate and alkyl methacrylate in which the alkyl ester groups of the alkyl acrylate and alkyl methacrylate are characterized as containing from 1 to 8 carbon atoms inclusive.

11. A vinylidene halide copolymer composition comprising the copolymerizate of:
(A) vinylidene halide as the principal copolymerized comonomer;
(B) from about 0.2 to about 5 percent by weight of copolymerized ethylenically unsaturated sulfated monomer represented by the structural formula:

wherein R is at least one member selected from the group consisting of hydrogen and hydrocarbyl, R' represents a hydrocarbylene group, n is an integer having a value of at least one, and M is a cation;
(C) from about 0.5 to 25 percent by weight of copolymerized hydroxyalkyl ester of an alpha, beta-ethylenically unsaturated carboxylic acid; and
(D) up to 40 percent by weight of copolymerized ethylenically unsaturated monomer other than copolymerized comonomers (A), (B) and (C).

12. The composition according to claim 11 wherein said composition comprises on a copolymerized comonomer weight basis from about 75% to about 87% vinylidene chloride, from about 0.25% to about 2.5% sulfated monomer (B), from about 5% to about 15% copolymerized hydroxyalkyl monomer (C) and at least 4% copolymerized monomer (D).

13. The composition according to claim 12 wherein the composition contains at least one unpolymerized surfactant selected from the group consisting of anionic surfactant and non-ionic surfactant with the total amount of said surfactant in the composition on a copolymer dry weight basis ranging from about 0.35% to about 1% and the composition contains (on a copolymer dry weight basis) less than 1% water-soluble salt contaminants.

14. The composition according to claim 12 wherein the copolymer contains from about 4% to about 15% by weight copolymerized alkyl ester of an alpha, beta-ethylenically unsaturated acid wherein the alkyl esters are at least one member selected from the group consisting of alkyl acrylate and alkyl methacrylate in which the alkyl group contains from 1 to 8 carbon atoms inclusive.

15. The composition according to claim 14 wherein the copolymerized sulfated monomer (B) comprises more than 0.5%, but less than 2% of the copolymer weight, R represents hydrogen or methyl, R' represents ethylene or propylene and n is an integer of 1 to 5 inclusive.

16. The composition according to claim 15 wherein at least 75% by weight of copolymerized hydroxyalkyl ester (C) comprises at least one copolymerized monomer or copolymerized monomer mixture of monomers of a member selected from the group consisting of hydroxyethyl acrylate and hydroxypropyl methacrylate.

17. The composition according to claim 15 wherein the non-polymerizable surfactant consists essentially of a combination of at least two anionic surfactants having different critical micelle concentration in a total amount ranging from about 0.4% to about 0.8% of the copolymer weight.

18. The composition according to claim 17 wherein the composition contains less than 0.3% by weight water-soluble salt contaminants on a copolymer dry weight basis.

19. In a method for preparing a vinylidene halide copolymer latex wherein pre-emulsified vinylidene halide and other copolymerizable monomers are continuously or intermittently feed into a copolymerization zone and copolymerized to a vinylidene halide copolymer latex, the improvement which comprises:
(I) preparing an aqueous comonomer pre-emulsion comprised of:
(A) vinylidene halide as the principal copolymerized comonomer;
(B) from about 0.2 to about 5 percent by weight of an ethylenically unsaturated sulfated monomer represented by the structural formula:

wherein R is at least one member selected from the group consisting of hydrogen and hydrocarbyl, R' represents a hydrocarbylene group, n is an integer having a value of at least one, and M is a cation;
(C) from about 0.5 to 25 percent by weight of a hydroxyalkyl ester of an alpha, beta-ethylenically unsaturated carboxylic acid; and
(D) up to 40 percent by weight of an ethylenically unsaturated monomer other than copolymerized comonomers (A), (B) and (C);
with said comonomers being emulsified by a combination of at least two different emulsifiers characterized as having different critical micelle concentration, said emulsifier being at least one member selected from the group consisting of anionic surfactants and non-ionic surfactants with the total amount of said emulsifier in said pre-emulsion being sufficient to provide a vinylidene halide copolymer particles of an average particle size less than 0.25 micron at an emulsifier concentration (based on the comonomer total weight) ranging from about 0.35% to about 1%;

(II) copolymerizing said pre-emulsified comonomers to provide a vinylidene halide latice containing copolymer particles of an average particle size less than 0.25 micron.

20. The method according to claim 19 wherein the pre-emulsified comonomer comprises from about 75% to about 87% vinylidene chloride, about 0.5 to about 2% sulfated monomer, about 5% to about 15% hydroxyalkyl monomer (C) with hydroxyethyl or hydroxypropyl ester of methacrylic acid or acrylic acid or mixtures thereof comprising at least 75% by weight of the total copolymerized monomer (C) weight, from about 5% to about 15% monomer (D) wherein at least 75% by weight copolymerized monomer (D) is comprised of alkyl acrylate or alkyl methacrylate or a combination of alkyl acrylate and alkyl methacrylate which have alkyl ester groups of 1 to 8 carbon atoms inclusive.

21. The method according to claim 20 wherein the copolymerized latex contains less than 0.3% by weight water-soluble salt contaminants (copolymer dry solids weight basis), the emulsifier concentration ranges from about 0.4% to about 0.8%, and in the sulfated monomer (B) R represents hydrogen or methyl, R' represents ethylene or propylene and n is an integer of 1 to 5 inclusive.

* * * * *